United States Patent [19]
Iwamoto et al.

[11] Patent Number: 5,710,607
[45] Date of Patent: *Jan. 20, 1998

[54] IMPACT RESISTANT LIQUID CRYSTAL APPARATUS

[75] Inventors: Hirofumi Iwamoto, Hiratsuka; Hisao Tajima, Yokohama; Makoto Uehara, Yokohama; Yoshihiro Onitsuka, Yokohama; Takao Miyamoto, Chigasaki; Hiroshi Takabayashi; Satoshi Yoshihara, both of Kawasaki, all of Japan

[73] Assignee: Canon Kabushiki Kaisha, Tokyo, Japan

[*] Notice: The term of this patent shall not extend beyond the expiration date of Pat. No. 5,150,231.

[21] Appl. No.: 264,232

[22] Filed: Jun. 22, 1994

Related U.S. Application Data

[63] Continuation of Ser. No. 41,875, Apr. 2, 1993, abandoned, which is a continuation of Ser. No. 910,433, Jul. 8, 1992, abandoned, which is a division of Ser. No. 634,740, Dec. 27, 1990, Pat. No. 5,150,231.

[30] Foreign Application Priority Data

Dec. 29, 1989 [JP] Japan .................................. 1-343132
Aug. 27, 1990 [JP] Japan .................................. 2-226021
Dec. 12, 1990 [JP] Japan .................................. 2-401564

[51] Int. Cl.⁶ ........................ G02F 1/1333; G02F 1/1345
[52] U.S. Cl. .............................................. 349/660; 349/150
[58] Field of Search ............................... 359/44, 48, 83, 359/100; 349/60, 64, 122, 150, 161

[56] References Cited

U.S. PATENT DOCUMENTS 4,545,647 10/1985 Sasaki et al. ......................... 359/83
5,150,231 9/1992 Iwamoto et al. ...................... 359/100

FOREIGN PATENT DOCUMENTS 58-106524 12/1983 Japan .
60-101521 6/1985 Japan .
63-179322 7/1988 Japan .
1-225921 9/1989 Japan .
1-237521 9/1989 Japan .
2093425 4/1990 Japan .
2178625 7/1990 Japan .
2-264222 10/1990 Japan .
2-264223 10/1990 Japan .
2264222 10/1990 Japan .
2264223 10/1990 Japan .
2180949 4/1987 United Kingdom .
2190529 11/1987 United Kingdom .

*Primary Examiner*—William L. Sikes
*Assistant Examiner*—Charles Miller
*Attorney, Agent, or Firm*—Fitzpatrick, Cella, Harper & Scinto

[57] ABSTRACT

A method of producing an impact resistant liquid crystal display, for a nematic liquid crystal display or a chiral smectic ferroelectric liquid crystal display, includes the steps of fixing a liquid crystal panel onto a panel fixing member so as to substantially expose the liquid crystal panel through an opening of the panel fixing member and disposing an elastic member along a periphery of the panel fixing member. The elastic member is affixed to a supporting member so as to define an almost closed space with the liquid crystal panel, the panel fixing member, the elastic member and the supporting member, whereby an air damping effect is created to suppress flexural deformation of the liquid crystal panel.

19 Claims, 10 Drawing Sheets

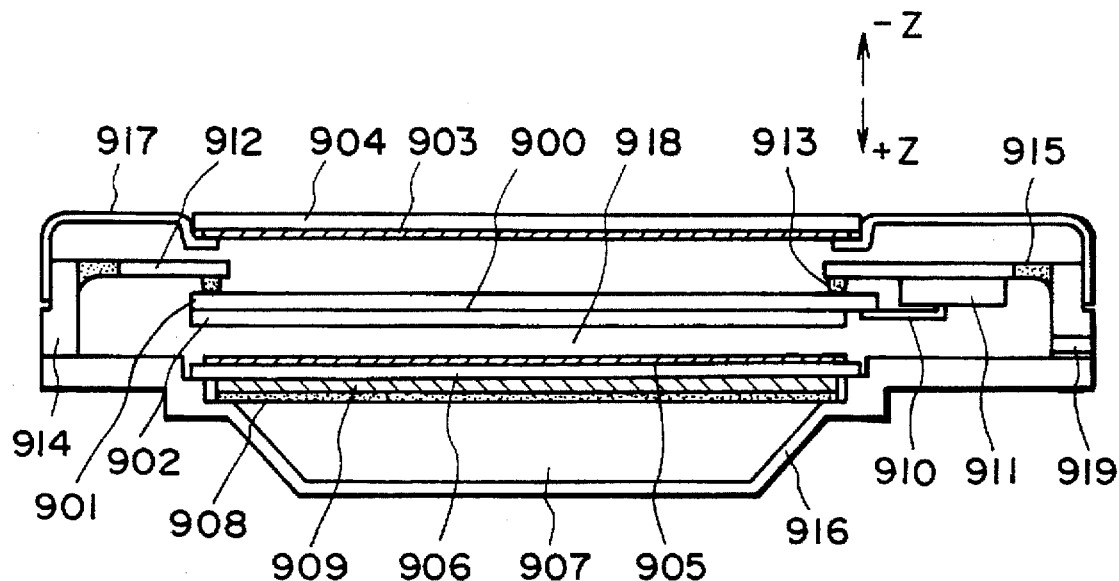
F I G. 9
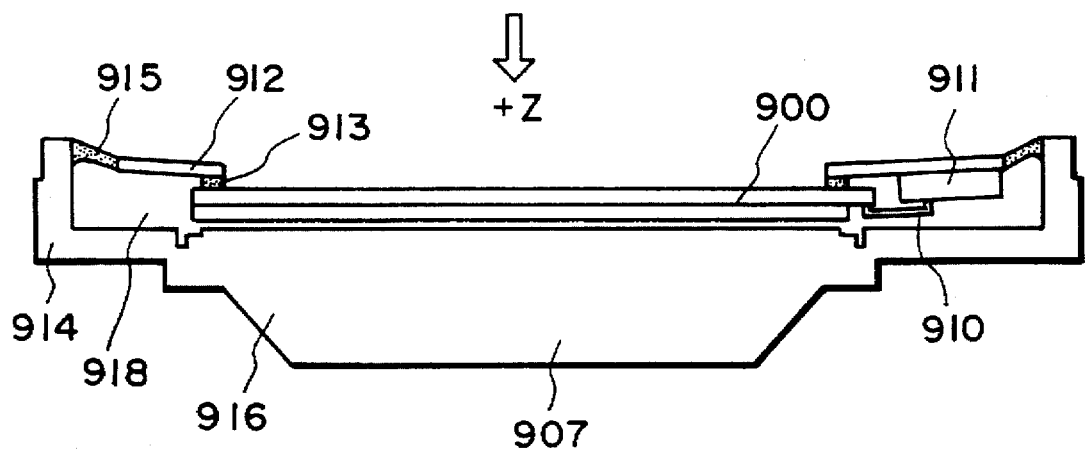
F I G. 10

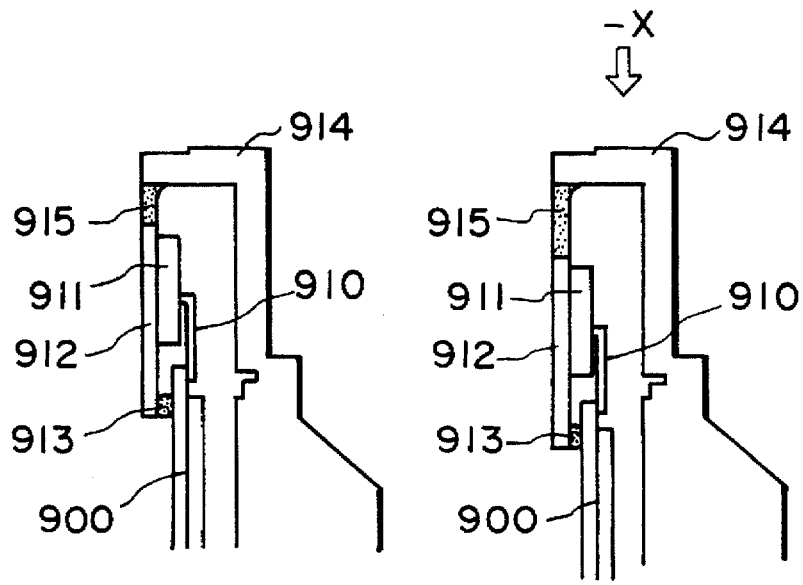
F I G. 12A   F I G. 12B
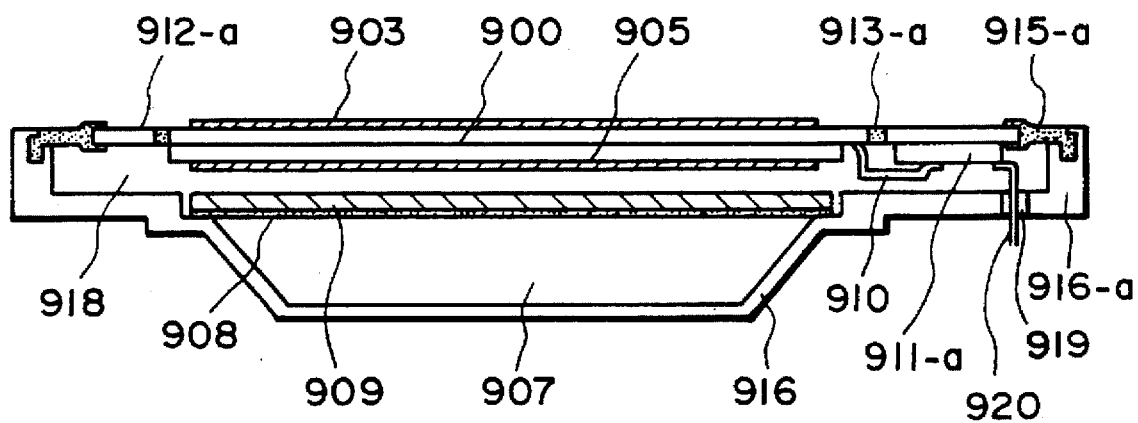
F I G. 13

5,710,607

IMPACT RESISTANT LIQUID CRYSTAL APPARATUS

This application is a continuation of application Ser. No. 08/041,875 filed Apr. 2, 1993, now abandoned which is continuation of application Ser. No. 07/910,433 filed Jul. 8, 1992, now abandoned which as a division of prior application Ser. No. 07/634,740 filed Dec. 27, 1990, now U.S. Pat. No. 5,150,231.

FIELD OF THE INVENTION AND RELATED ART

The present invention relates to a liquid crystal apparatus for displaying images, particularly a ferroelectric liquid crystal display apparatus.

Hitherto, a liquid crystal panel has been supported in a liquid crystal display apparatus in a manner as shown in FIG. 7. Referring to FIG. 7, a liquid crystal display apparatus includes a liquid crystal panel 704 in which a liquid crystal is sealed therein, an upper polarizing plate 703, a lower polarizing plate 705, a circuit board 702 for electrically driving the liquid crystal panel 704, a rubber connector 706 for electrically connecting the liquid crystal panel 704 and the circuit board 702, a backlight 707 for illuminating the liquid crystal panel 704, a frame 700 for securing the liquid crystal panel, and a bending part 701 for joining the liquid crystal panel 704, the circuit board 702 and the backlight 707.

However, the above-mentioned conventional system for supporting a liquid crystal panel has been developed with respect to a nematic liquid crystal panel and, when a ferroelectric liquid crystal panel is supported in a manner as shown in FIG. 7, the following problems have been encountered:

(1) When the liquid crystal panel is fixed or supported, distortion is applied to the panel, so that the alignment of the ferroelectric liquid crystal is changed to cause deterioration of image quality.

(2) In comparison with a nematic liquid crystal, even a much smaller impact or vibration can cause an alignment change resulting in image quality deterioration, when the impact is communicated to the liquid crystal panel. The alignment change or disorder is referred to as a sanded texture caused by destruction of a layer structure characteristic to a ferroelectric chiral smectic phase.

In view of the above problem, our research group has already proposed a system as shown in FIG. 8 (Japanese Patent Application No. 242577/1988).

Referring to FIG. 8, the system includes a liquid crystal panel 805 for image display, a circuit board 802 for electrically driving the liquid crystal panel 805, a flexible print-circuit film 803 for electrically connecting the liquid crystal panel 805 and the circuit board 802, and a housing 801 of, e.g., a metal block or metal die-cast having a rigidity sufficient for supporting the liquid crystal panel 805 and the circuit board 802. The system also includes an adhesive 806 for fixing the liquid crystal panel 805, an insulating plate 802, for electrically isolating the circuit board 802 and the housing 801 from each other, a backlight 807 for illuminating the liquid crystal panel 805, and a diffusion plate 808 disposed in front of the backlight 807 for providing diffused and scattered light.

According to the system shown in FIG. 8, as a metal housing 801 which hardly provides any distortion to the liquid crystal panel 805 when subjected to an external load is used, it is possible to securely hold the liquid crystal panel 805 in a stable state and prevent the alignment change and image quality deterioration due to external force after the fixing.

The above-described system using a metal housing shows a remarkable effect against a mechanical deformation due to a static external force but has caused the following problems when subjected to a dynamic external load, such as impact and vibration. More specifically, referring to FIG. 8, the liquid crystal panel 805 is fixed onto the housing 801 by the adhesive 806 with respect to the lower peripheral part thereof and therefore, when supplied with an impact in a +Z direction as indicated, causes a displacement of the central part thereof in the +Z direction with the peripheral parts as fulcrums to result in a bending deformation of the liquid crystal panel. Accordingly, when the liquid crystal panel is enlarged in size, the amount of the bending is increased until it exceeds a certain value to cause alignment change and image quality deterioration. For this reason, in order to minimize the bending of the liquid crystal panel 805, it has been conceived to cause the liquid crystal panel 805 to contact the upper surface of the diffusion plate 808 disposed above the backlight 807 so as to suppress the bending but, in this case, a problem is found in heat-treatment for alignment to be performed after the fixing of the liquid crystal panel as described below.

A ferroelectric liquid crystal used in a chiral smectic phase involves peculiar problems unlike a conventional nematic liquid crystal. One is the necessity of so-called "re-aligning treatment" which is a step of once heating the liquid crystal panel after fixation thereof to the housing to a higher temperature than the chiral smectic temperature range and gradually cooling the panel to a temperature within the chiral smectic temperature range. This re-aligning treatment is required because a ferroelectric liquid crystal causes an alignment change at a much smaller mechanical stress than a nematic liquid crystal and also because, when it is once cooled to a crystal state below the chiral smectic temperature range, it cannot be restored into chiral smectic phase by simply re-heating it to the chiral smectic temperature range. Thus, if the ferroelectric liquid crystal loses to normal alignment state in chiral smectic phase either application of an external shock or excessive cooling, the normal alignment state in chiral smectic phase having a characteristic layer structure can be restored only by such a re-aligning treatment of heating to a temperature above the chiral smectic temperature range and subsequent gradual cooling to the chiral smectic temperature range.

When such a re-aligning treatment is applied to a ferroelectric liquid crystal apparatus as shown in FIG. 8 wherein the liquid crystal panel 805 contacts the diffusion plate 808 disposed on the backlight 807, the liquid crystal panel receives a large bending stress from the backlight 807 and the diffusion plate 808 under heating for the re-aligning treatment because the backlight 807 and diffusion plate 808 are generally made of plastic materials having a considerably larger thermal expansion coefficient than the liquid crystal panel 805. If the liquid crystal panel 805 has different states under heating for the re-aligning treatment and after the gradual cooling thereafter, the ferroelectric liquid crystal cannot resume a characteristic chiral smectic layer structure even after the re-aligning treatment, thus causing a failure in alignment control of the liquid crystal panel.

The use of a metal housing 801 as shown in FIG. 8 also leads to problems of a high production cost and a heavy weight compared with a plastic one.

Another problem peculiar to a ferroelectric liquid crystal is that it has a switching threshold characteristic and a response speed characteristic which vary depending on temperature change more sensitively than a conventional nematic liquid crystal.

In order to solve the above problem and for heating for the re-aligning treatment, a liquid crystal display apparatus having an internal heater as shown in FIG. 14 has been proposed (Japanese Laid-Open Patent Application JP-A 237521/1989). Referring to FIG. 14, the apparatus includes a liquid crystal panel 1401 in which a ferroelectric liquid crystal is sealed therein and to which an upper polarizing plate 1407 and a lower polarizing plate 1408 are fixed by bonding with an adhesive, and the panel 1401 is supported by a support 1409. The liquid crystal display apparatus further includes a backlight 1401 for illuminating the liquid crystal panel 1401 and a planar heating member 1402 bonded to the front-side surface of the backlight 1403. The planar heating member 1402 comprises a transparent electrode disposed on the entirety of one surface of a glass plate and a pair of lead-out electrodes formed by applying an electroconductive point on both sides of the transparent electrode. The liquid crystal apparatus further includes a circuit board 1404 comprising a liquid crystal drive circuit and a heating member-control circuit and connected with the liquid crystal panel 1401 through a lead wire 1406 and with the planar heating member 1402 through a lead wire 1410. The quantity of heat generation from the planar heater 1402 is controlled by the heating member control circuit on the circuit board 1404 based on a temperature signal from a temperature sensor 1405 attached to the liquid crystal panel 1401.

Such a liquid crystal display apparatus having a heater as described above, however, involves a problem as described below. As the heater contacts other members, such as a backlight, the heat therefrom is absorbed by such other members to lower the heat generating efficiency and results in a large temperature distribution. Particularly, as the peripheral part of the heater is exposed, the heat dissipation is further enhanced to lower the peripheral part temperature and result in a large temperature difference over the extension of the liquid crystal panel, so that it is difficult to display a uniform image on the entire extension of a ferroelectric liquid crystal panel having a large temperature-dependence of switching characteristic.

Further, the re-aligning treatment requiring a further higher heater temperature involves a problem as follows. For the re-alignment, it is necessary to heat the ferroelectric liquid crystal to a temperature giving cholesteric phase or isotropic liquid phase which is generally a temperature as high as 70°–90° C. On the other hand, the polarizing plate (polarizer) is generally durable only at a low temperature of 70°–80° C., and the backlight using a plastic part is also weak against heat. In the apparatus shown in FIG. 14 wherein the polarizing plate and backlight are contacting or disposed in the vicinity of the heater, the temperature of the polarizing plate or the backlight member approaches or exceeds the durable temperature, so that these members are liable to cause deformation, peeling or bubble formation. Further, a polarizing plate generally causes a thermal shrinkage under heating in the polarizing axis direction (direction of stretching of the film during the production) and it is directly applied to the liquid crystal panel, so that a mechanical distortion is applied thereby to the liquid crystal panel at an elevated temperature, thus being liable to cause an alignment defect or a change in switching threshold characteristic leading to a failure in uniform image formation.

Further, the liquid crystal panel shown in FIG. 14 is not adequately protected from external mechanical forces, such as dropping impact and vibration, so that an alignment defect is liable to occur whenever the liquid crystal panel is subjected to an external stress and the re-aligning treatment is frequently required to repair the alignment defect. Accordingly, the maintenance of the liquid crystal display apparatus becomes complex and the frequent heating for the re-aligning treatment further accelerates the deterioration of the members, such as the polarizing plate, to shorten the life of the display apparatus.

SUMMARY OF THE INVENTION

An object of the present invention is to provide a liquid crystal display apparatus improved in respects of flexural deformation, alignment change or disorder and image quality deterioration which have been caused when the liquid crystal panel is subjected to a dynamic external load or force, such as dropping impact or vibration.

Another object of the present invention is to provide a liquid crystal display apparatus having a remarkably improved resistance to repetitive application of impacts.

Another object of the present invention is to provide a liquid crystal display apparatus having an improved reliability.

According to the present invention, there is provided a liquid crystal display apparatus, comprising:

(a) a liquid crystal panel comprising a pair of substrates each provided with an electrode and a liquid crystal disposed between the substrates, (b) a supporting member having a frame for supporting the liquid crystal panel, and (c) an elastic member for fixing the liquid crystal panel in a floating state to the frame of the supporting member so as to define an almost closed space enclosed with the liquid crystal panel, the supporting member and the elastic member.

When the liquid crystal display apparatus of the present invention is subjected to a dynamic external load, such as a dropping impact, the flexural deformation of the liquid crystal panel is alleviated due to an air-damper effect of the almost closed space, whereby adverse alignment change and image quality deterioration are prevented.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 9 is a cross-sectional view of another embodiment of the liquid crystal display apparatus according to the invention.

FIG. 10 is a cross-sectional view illustrating a characteristic deformation state of a liquid crystal panel in the liquid crystal display apparatus of the invention when the apparatus is subjected to a dropping impact.

FIGS. 12A and 12B are partial cross-sectional views illustrating a characteristic deformation at a hanging part (a supporting part) when the liquid crystal display apparatus of the invention is subjected to a dropping impact in a vertical direction.

FIG. 13 is a cross-sectional view of a further embodiment of the liquid crystal display apparatus of the invention.

DESCRIPTION OF THE PREFERRED EMBODIMENTS

Figure 1:
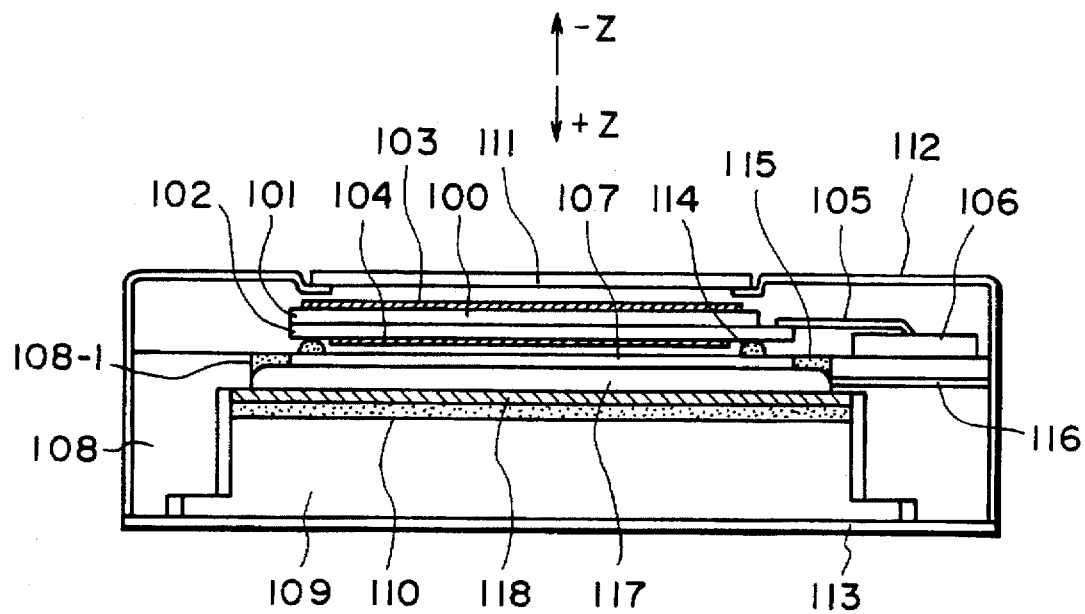
FIG. 1 is a cross-sectional view of a liquid crystal display apparatus according to the present invention.

FIG. 1 is a cross-sectional view of a first embodiment of the liquid crystal display apparatus of the present invention. Referring to FIG. 1, the liquid crystal display apparatus includes a liquid crystal panel 100 which comprises a pair of oppositely disposed glass substrates 101 and 102 between which a liquid crystal (not specifically shown) is disposed, an upper polarizer 103, a lower polarizer 104, a circuit board 106 for driving the liquid crystal panel 100, and a flexible print circuit film 105 for electrically connecting the circuit board 106 and the liquid crystal panel 100. The apparatus further includes a panel-supporting substrate 107 which is made of glass for supporting the liquid crystal panel 100 and on which a rubber-type adhesive is applied along the whole periphery of the lower side of the panel to be fixed. A housing 108 of, e.g., plastic, is disposed to fixedly support the liquid crystal panel 100, the panel-supporting substrate 107 and the circuit board 106, and the resultant opening between the edge of the panel-supporting substrate 107 and the window frame 108-1 of the housing is packed with an elastic or elastomeric member 115 of, e.g., a rubber-type silicone adhesive. Herein, the elastic member is a member causing an elastic deformation substantially preferentially to the liquid crystal panel and the frame connected therewith. The apparatus further includes a backlight 109 for illuminating the liquid crystal panel 100 and a diffusion plate 110 for converting the light from the backlight 109 into scattering diffusive light; lamps, a reflecting plate, etc., disposed inside the backlight 109 being omitted from showing. A partitioning plate 118 of, e.g., glass, is disposed with its lower surface supported by the diffusion plate 110 and with its upper peripheral part abutted to the window frame 108-1 of the housing. The partition plate 118 is supported by the backlight 109 and the diffusion plate 110 and therefore is not displaced in a +Z direction. An almost closed space 117 is defined by the panel-supporting substrate 107, the housing window frame 108-1, the partition plate 118 and the elastic member 115 and is communicated with the exterior atmosphere through a minute bore or perforation 116. A protective glass plate 111 is secured to the window frame of an upper cover 112 which is disposed opposite to a lower cover 113 covering the bottom side of the backlight 109 and the housing 108. The upper cover 112 and lower cover 113 are screwed (not shown) to each other and connected to the ground potential of the circuit board 106 for decreasing noises.

Figure 2A:
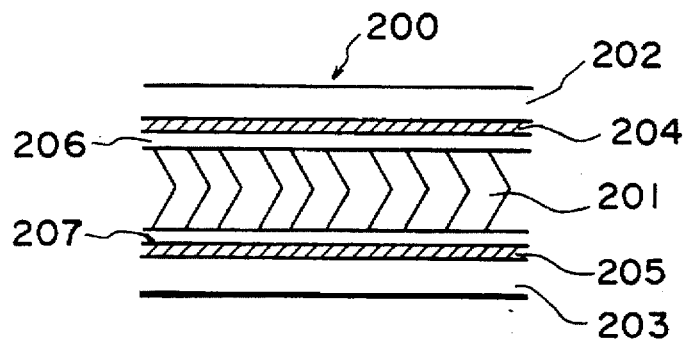
FIGS. 2A and 2B are enlarged sectional views illustrating a change in laminar structure of a ferroelectric liquid crystal panel.

Some characteristic features of the above-described first embodiment of the liquid crystal display apparatus are described hereinbelow, of which an alignment deterioration causing image quality deterioration is described first. FIG. 2A is a schematically enlarged view of a liquid crystal panel 200 corresponding to the liquid crystal panel 100 shown in FIG. 1. Referring to FIG. 2A, the liquid crystal panel 200 comprises a ferroelectric liquid crystal 201 disposed in a layer with a thickness of about 1.4 micron sandwiched between a pair of 1.1 mm-thick glass plates respectively having thereon about 1500 Å-thick ITO ($In_2O_3$-$SnO_2$) electrode films 204 and 205 for driving the ferroelectric liquid crystal 201 and about 100 Å-thick polyimide alignment films 206 and 207 for maintaining the alignment of the ferroelectric liquid crystal 201 which as a result assumes a regular layer structure with a bend at the central part thereof as shown.

Figure 3:
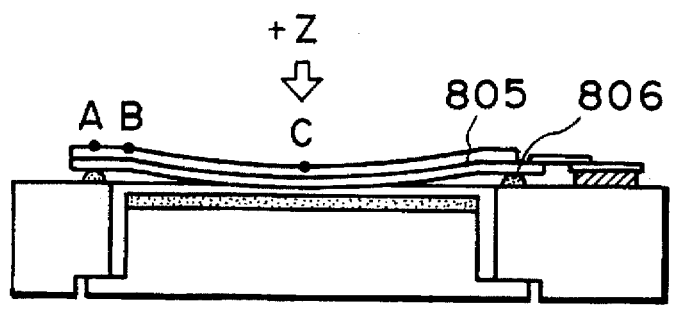
FIG. 3 is a cross-sectional view illustrating a state of deformation of a liquid crystal panel in a conventional liquid crystal display apparatus when the apparatus is subjected to a dropping impact.
Figure 8:
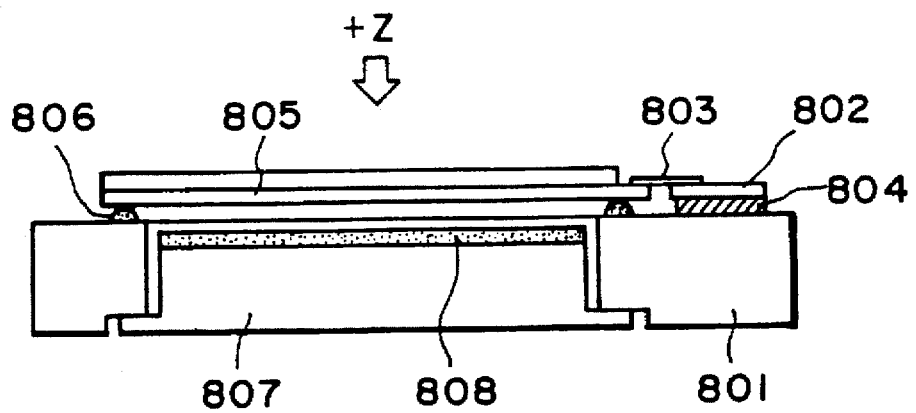

Then, when the liquid crystal panel 200 receives an external mechanical force in the +Z direction, the panel 200 deforms and, if the deformation exceeds a certain value, the layer structure of the ferroelectric liquid crystal 201 collapses to cause an alignment defect, such as a sanded texture. When an image is intended to be displayed in this state, the normal switching characteristic of the ferroelectric liquid crystal 201 is lost to fail in formation of good images. In an actual supporting structure of the liquid crystal panel, a deformation of the panel accompanied with collapsion of the liquid crystal layer structure is liable to occur as a local flexural deformation. In other words, a region subjected to a uniform flexural deformation does not readily cause collapsion of the liquid crystal layer structure in comparison with a region causing a local flexural deformation. FIG. 3 illustrates the flexural deformation of a liquid crystal panel 805 when a conventional liquid crystal display apparatus shown in FIG. 8 is subjected to a dropping impact in a +Z direction. The same references numerals denote identical members in FIGS. 3 and 8. The liquid crystal panel 805 causes the largest displacement in the Z direction at the central part C compared with the initial state, and a part A immediately above the adhesive 806 functions as a fulcrum and is not displaced. Along the entire extension of the liquid crystal panel 805, a maximum flexural deformation per unit area (a smallest radius of curvature) occurs at a point B or in the vicinity thereof where an alignment defect, such as s sanded texture, occurs. According to such a liquid crystal panel-supporting state, a larger local flexural deformation results to cause a further lowering in impact resistance as the liquid crystal panel size is enlarged.

Figure 4A:
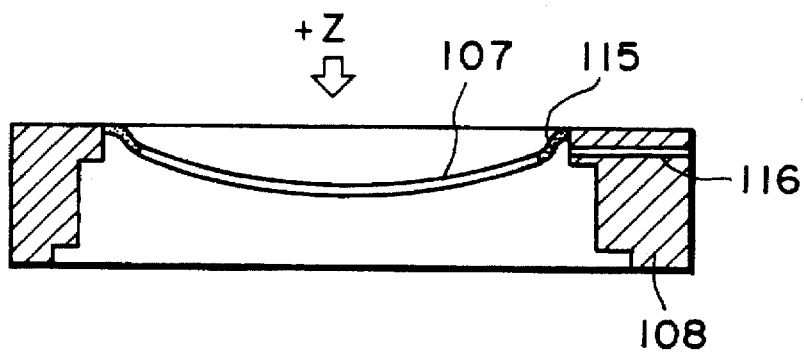
FIGS. 4A and 4B are cross-sectional views illustrating a characteristic deformation state of a liquid crystal panel in a liquid crystal display apparatus of the invention when the apparatus is subjected to a dropping impact.
Figure 4B:
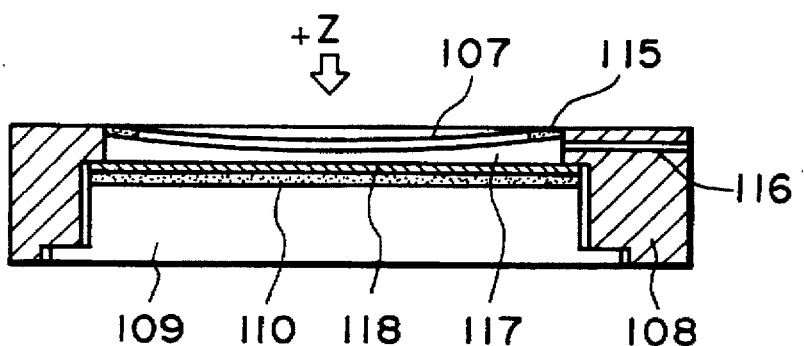

In the embodiment of the present invention on the other hand, the liquid crystal panel is supported in a window of the housing by an elastic member is a floating or hanging state so as to form therebelow an almost closed space, so that the liquid crystal panel cause only a very small flexural deformation because of an air damper function even when supplied with an impact, thereby preventing the occurrence of an alignment defect, such as a sanded texture. FIGS. 4A and 4B schematically illustrate the state of the panel-supporting substrate 107 supported by the elastic member 115 for the purpose of illustrating the characteristic flexural deformation of the liquid crystal panel when the liquid crystal display apparatus according to the embodiment receives a dropping impact in a +Z direction. The liquid crystal panel 100 is fixed onto the panel-supporting substrate 107 by the adhesive 114 and therefore substantially conforms to the deformation of the panel-supporting substrate 107.

First, FIG. 4A shows the flexural deformation state of the panel-supporting substrate 107 in an apparatus formed by removing the backlight 109, the diffusion plate 110 and the partition plate 118 from the embodiment of the liquid crystal display apparatus shown in FIG. 1, i.e., in the absence of the almost closed space 117, when the apparatus is supplied with a dropping impact in a +Z direction. Incidentally, the upper cover 112, the lower cover 113 and the protective glass plate 111 are also omitted from showing for facility of understanding while they are actually present. In this instance, the elastic member 115 causes a large deformation in the +Z direction to result in a uniformly large flexural deformation of the panel-supporting substrate 107.

Next, FIG. 4B shows the state of the deformation of the panel-supporting substrate 107 when the liquid crystal display apparatus of this embodiment is supplied with a similar dropping impact in the +Z direction. In this case, the almost closed space 117 functions as an air damper to uniformly affect the panel-supporting substrate 107, so that the flexural deformation of the panel-supporting substrate becomes smaller and the flexural deformation of the liquid crystal panel thereon becomes smaller correspondingly to result in an improved impact resistance.

Figure 5:
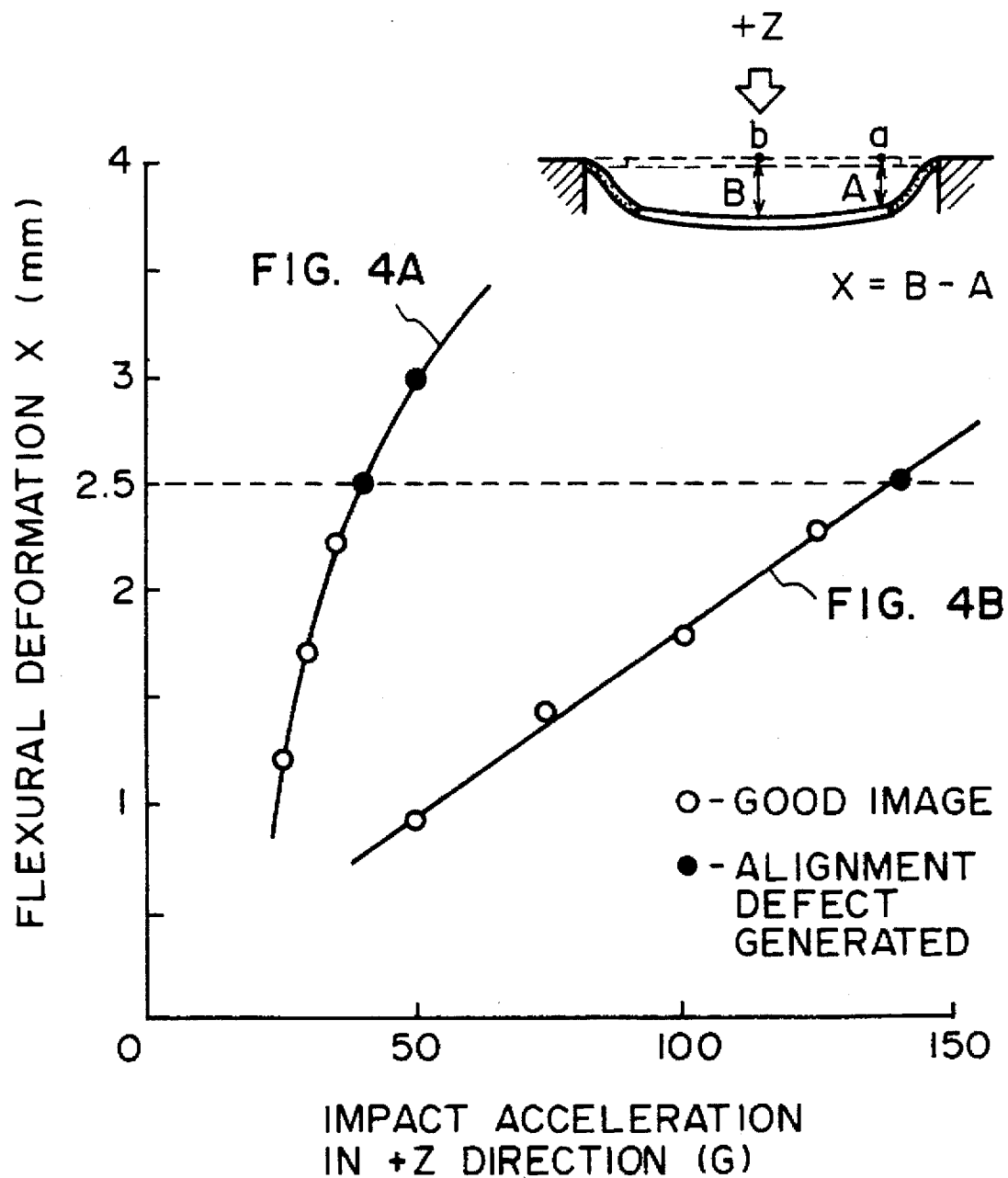
FIG. 5 is a characteristic view for illustrating an air damper effect.

FIG. 5 is a characteristic view wherein relationships between the flexural deformation and dropping impact are shown based on measured data with respect to each of the cases shown in FIGS. 4A and 4B for explaining the air damper effect. The liquid crystal panel used in the measurement comprises two 1.1 mm-thick plates measuring vertically 300 mm and transversely 250 mm, and the size of the panel-supporting substrate was almost the same as that of the liquid crystal panel. Herein, the flexural deformation X is represented by X=A-B, wherein A and B respectively denote the values of displacement of the point a at an end and the point b at the center of the panel-supporting substrate 107 from the respective initial positions in the +Z direction. In FIG. 5, the mark ● denotes that a sanded texture appeared and the mark ○ denotes that no defect occurred to provide good images. From FIG. 5, it is understood that alignment defects occurred at a flexural deformation X of 2.5 mm or larger and the flexural deformation was suppressed by an air damper effect in the embodiment, thereby resulting in a remarkable increase in impact resistance.

As described above, the almost closed space 117 in this embodiment is essential in order to attain an air damper effect but it need not be a completely airtight space. Thus, the above-mentioned air damper effect or function has been attained even when a small air-leaking bore or gap is present. This is because the dropping impact generally functions only for a short period of about 6–11 msec. It is rather preferred that an air-leaking hole, such as a minute bore, is present than a completely airtight space. This is because, when the liquid crystal display apparatus is transported by air, it is placed under a considerably reduced pressure. Under such a reduced pressure, a completely airtight space causes a remarkable expansion of air therein to cause a large flexural deformation of the liquid crystal panel. The minute bore or hole provided in the liquid crystal display apparatus of the invention can be arbitrarily designed with respect to its size, position, shape and number and need not be provided in the housing but can be on the backlight side as far as the flexural deformation parameter X satisfies X<2.5 mm. In case of a different liquid crystal panel size, the minute bore can be arbitrarily designed within an extent of providing an air damper effect.

In the above, the air damper function of the almost closed space 117 has been explained with reference to a dropping impact in a +Z direction but the almost closed space 117 is also effective against a dropping impact in a -Z direction in view of the nature thereof. Thus, even in case where the liquid crystal panel 100 is subjected to deformation due to an impact in the -Z direction, the almost closed space 117 functions to suppress the flexural deformation uniformly over the entire extension of the liquid crystal panel through suppressed expansion thereof. Accordingly, the liquid crystal display apparatus according to the present invention not only is effective against the dropping impact in the ±Z directions to which a ferroelectric liquid crystal panel is the least resistant but also shows a similar effect against vibration.

Further, according to the structure of the invention, the liquid crystal panel 100 need not be fixed onto the housing 108, so that the alignment deterioration of the liquid crystal panel is not so dependent on the mechanical strength of the housing 108 as in the conventional apparatus. Further, the liquid crystal panel is not supplied with a bending stress at the time of re-aligning treatment as described hereinbefore. Accordingly, a plastic-made housing having a smaller rigidity than a metal housing can be used. Further, an insulating plate 804 used in the conventional apparatus shown in FIG. 8 is not required in this embodiment. In the above embodiment, a rubber-type silicone adhesive is used to constitute the elastic member 115, but another rubbery or elastic material can be used instead thereof.

Figure 6:
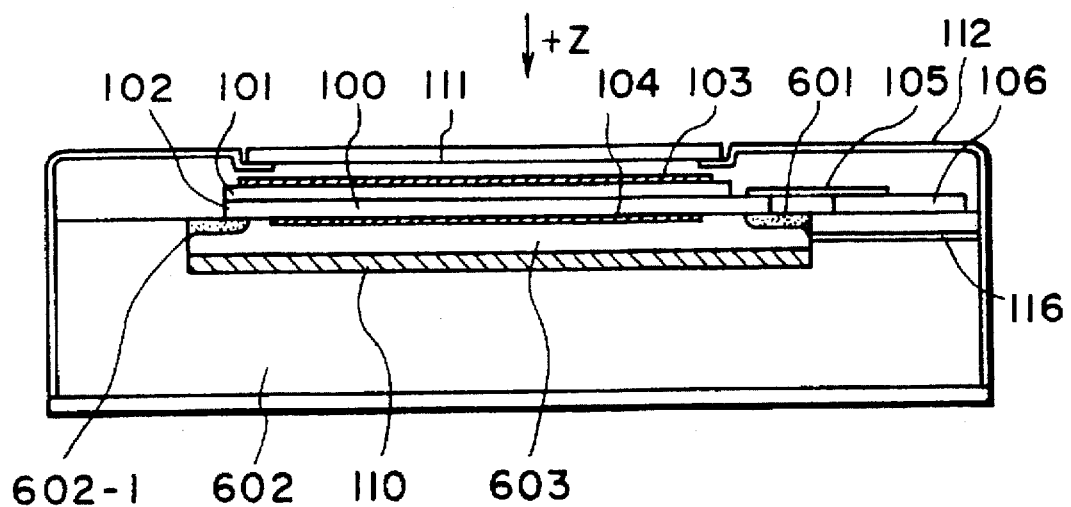
FIG. 6 is a cross-sectional view of a second embodiment of the liquid crystal display apparatus according to the invention.
Figure 7:
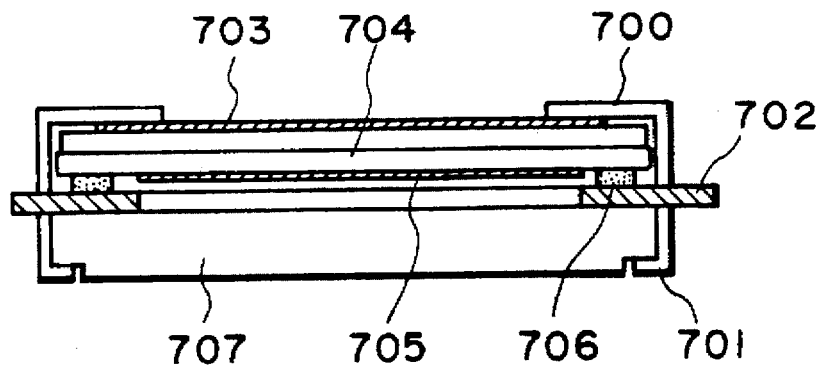
FIGS. 7 and 8 are respectively a cross-sectional view of a conventional liquid crystal display apparatus.

FIG. 6 shows a second embodiment of the present invention, wherein the same reference numerals denote identical members as in FIG. 1. In this embodiment, an elastic member 601 directly contacts the lower peripheral surface past of the liquid crystal panel 100 to support the panel. Further, the diffusion plate 110 also functions as the partition plate 118 in FIG. 1. In this instance, the diffusion plate 110 is supported by the backlight so as not to be displaced in the Z direction. Further, the backlight 602 is formed from a plastic integrally with the housing 108 in the embodiment shown in FIG. 1. As a result, an almost closed space 603 is defined by the liquid crystal panel 100, the opening window frame 602-1 of the backlight, the diffusion plate 110 and the elastic member 601. A similar effect as in the first embodiment can be obtained according to the above structure. According to this embodiment, the panel-supporting substrate 107, the partition plate 118 and the housing 108 shown in FIG. 1 are omitted or integrally formed with other members, whereby the number of parts required is decreased to allow an economical production and a thinner and lighter-weight liquid crystal display apparatus.

The above embodiments have been explained with reference to a ferroelectric liquid crystal but the panel-supporting structures of these embodiments can be also applied to a nematic liquid crystal. Further, these embodiments are not restricted to transmission-type liquid crystal display apparatus but can be formed as a reflection-type liquid crystal display apparatus wherein the backlight 108 or 602 is replaced by a supporting member lacking an illumination function.

In a preferred embodiment of the present invention, a liquid crystal panel, a print circuit film (TAB film) and a circuit board for driving are disposed on a panel-fixing plate, and the panel-fixing plate is supported by an elastic member in a floating or hanging state in an opening of a supporting member to form an almost closed space below and/or above it.

According to such an embodiment, not only the flexural deformation of a liquid crystal panel is alleviated due to the air damper function to prevent alignment deterioration and image quality deterioration when the liquid crystal display apparatus is supplied with a dynamic external load, such as a dropping impact, but also the print-circuit film and the circuit board for driving electrically connected to the liquid crystal panel can sufficiently conform to the displacement of the liquid crystal panel by the medium of the panel-fixing plate, so that the breakage of the print-circuit film pattern is prevented to provide a stable display.

Incidentally, the present invention provides a most effective solution in the case where a liquid crystal panel, a TAB-IC and a print-circuit board are constituted as separate members but is also applicable to a structure wherein a drive IC and its peripheral circuit are directly formed on a liquid crystal panel, e.g., a COG (chip-on-glass) structure.

As described above, in the liquid crystal display apparatus embodiment shown in FIG. 1, the liquid crystal panel 100 is fixed to the panel-supporting substrate 107 and the circuit board 106 electrically connected to the liquid crystal panel 100 through the print-circuit film 105 is fixed to the housing 108. It has been found that the apparatus involves the following problem when it is supplied with a dynamic external load, such as impact and vibration. More specifically, referring to FIG. 1, the liquid crystal panel 100 is fixed to the panel-supporting substrate 107 by means of the adhesive 114 applied to the lower peripheral surface part of the panel, so that the liquid crystal panel is displaced in the direction of an impact when it receives such an impact. According to our experiment, the distance of displacement was 2.5–3 mm in the ±Z direction and 4.5 mm in a ±Y direction (defined as perpendicular to the drawing) respectively at the electrode lead-out or takeout part of the liquid crystal panel 100, when an impact acceleration of 100 G was applied. The displacement of the circuit board 106, however, was nearly 0 mm even when supplied with an impact of 100 G because it was fixed to the housing 108. As a result, the print-circuit film 105 electrically connecting the liquid crystal panel 100 and the circuit board 106 was required to be elongated or contacted by 4.5 mm at the maximum while it was for a short time of 6–11 msec. However, as the paint-circuit film 105 pattern was formed of a copper foil of about 20 microns in thickness and 200 microns in width and mechanically weak, the pattern easily caused breakage during our impact and vibration tests, thus failing to provide a display.

An embodiment of the present invention solving the above problem will now be described with reference to FIG. 9, which shows such a preferred embodiment of the liquid crystal display apparatus according to the invention. Referring to FIG. 9, the liquid crystal display apparatus includes a liquid crystal panel 900 which comprises a pair of oppositely disposed glass substrates 901 and 902 between which a liquid crystal (not specifically shown) is disposed, an upper polarizer 903, an upper polarizer glass plate 904 on which the upper polarizer 903 is applied, a lower polarizer 905, a lower polarizer glass plate 906 on which the lower polarizer 905 is applied, a backlight 907 for illuminating the liquid crystal panel 900, a light curtain 908 for improving the ununiformity in luminance of the backlight 907, and a diffusion plate 909 for converting illumination light from the backlight into scattered diffusive light; lamps, a reflecting plate, etc., disposed inside the backlight 907 being omitted from showing. The display apparatus further includes a circuit board 911 for driving the liquid crystal panel 900, a print circuit film 910 of, e.g., a TAB (tape automation bonding) film, for electrically connecting the circuit board 911 to the electrode part of the liquid crystal panel 900, a panel-fixing plate 912 of, e.g., a plastic, for fixing the liquid crystal panel 900 and the circuit board 911, a rubber-type adhesive 913 applied onto the whole peripheral part of the upper peripheral surface part (particularly in the vicinity of the liquid crystal sealing part) of the liquid crystal panel 900 for bonding the panel 900 to the panel fixing plate 912, a supporting member 914 having an opening for supporting the panel-supporting plate 912 therein and connected to a backlight frame member 916 (with a connecting means not specifically shown), an elastic member 915 of e.g. a rubber-type silicone adhesive packed between the opening frame part of the supporting member 914 and the peripheral edge of the panel-supporting plate 912, a backlight frame member 916 provided with a reflecting part (not specifically shown) of the backlight 907 and disposed for fixing the lower polarizer glass plate 906, the diffusion plate 909, the light curtain 908 and the supporting member 914, a cover 917 of e.g. a plastic fixed to the supporting member 914 e.g. by means of a screw (not shown) for fixing the upper polarizer glass plate 904 e.g. by means of a double face-coated adhesive tape (not shown), an almost closed space 918 defined by the liquid crystal panel 900, the adhesive 913, the panel-fixing plate 912, the elastic member 915, the supporting member 914, the backlight frame member 916 and the lower polarizer glass plate 906, and a small bore 919 for communicating the almost closed space 918 with the exterior atmosphere and for passing a wire cable for supplying electric signals to the circuit board 911.

The characteristic features of this preferred embodiment will be described starting with the deformation of the liquid crystal panel 900 causing image quality deterioration.

FIG. 10 illustrates the state of deformation of the liquid crystal panel 900 when the liquid crystal display apparatus shown in FIG. 9 is supplied with a dropping impact in a +Z direction. The same numerals represent identical parts in FIGS. 9 and 10 and some parts not necessary for explanation are omitted from showing in FIG. 10.

Figure 11:
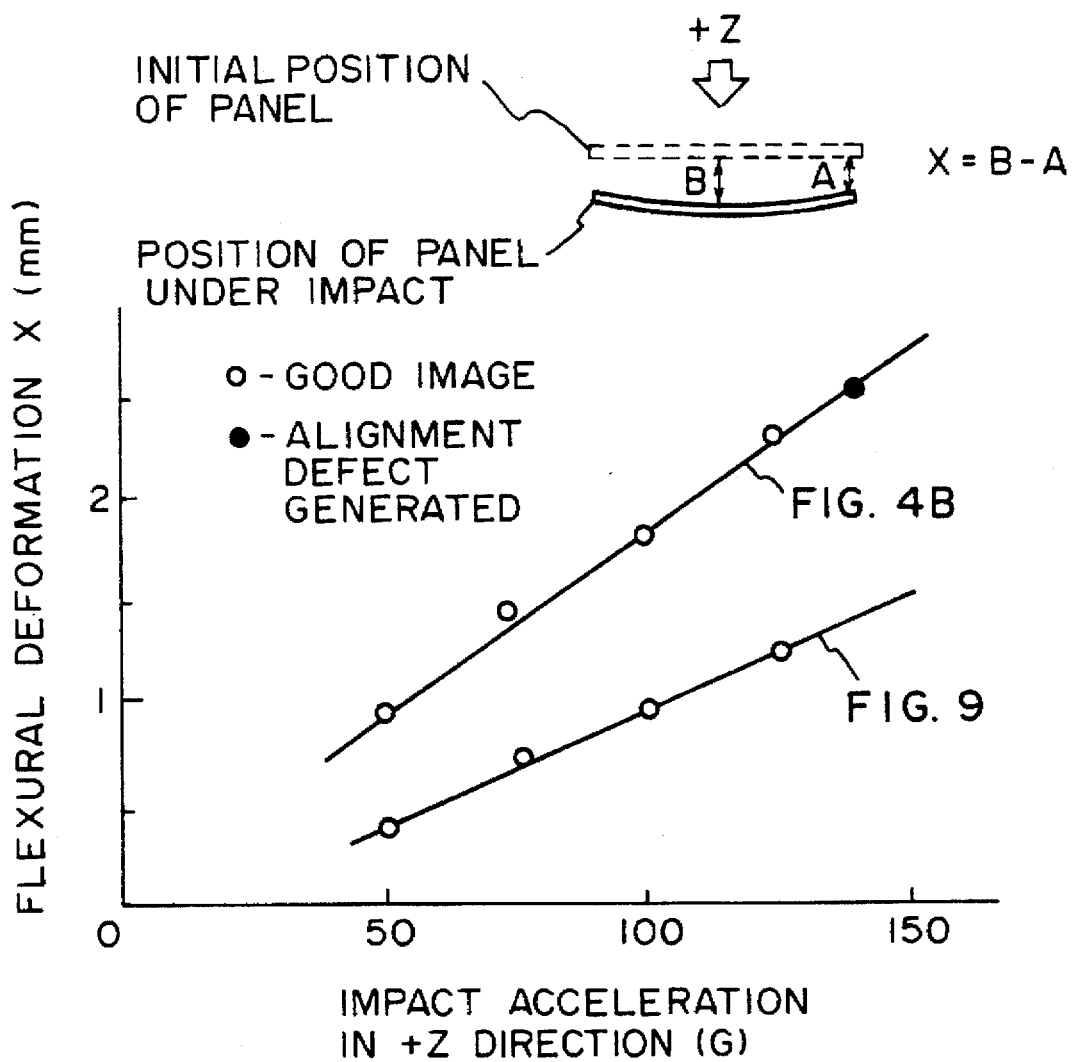
FIG. 11 is a characteristic view for illustrating an air damper effect in comparison between the apparatus shown in FIGS. 4A and 9.
Figure 14:
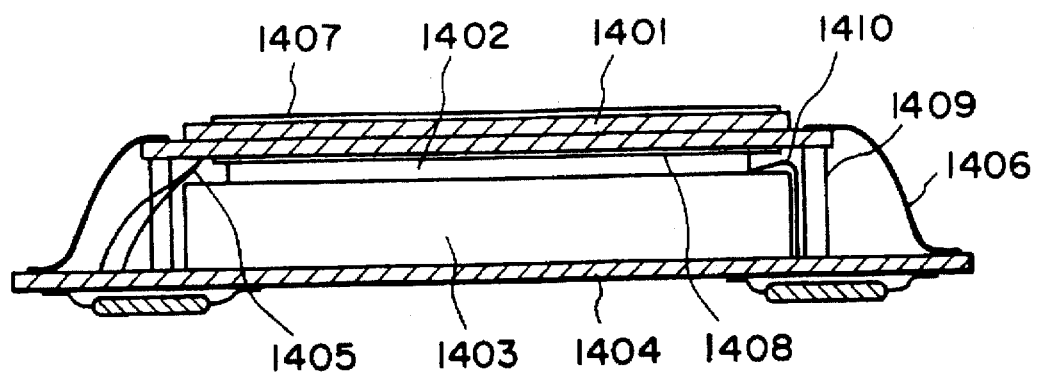
FIG. 14 is a cross-sectional view of another liquid crystal display apparatus of the prior art.

Referring to FIG. 10, when supplied with a dropping impact in the +Z direction, the liquid crystal panel 900 approaches the backlight 907. At this time, the elastic member 915 supporting the panel-fixing plate 912 in a floating state causes the largest flexural deformation, and the displacement of the panel-fixing plate 912 and the liquid crystal panel 900 is suppressed by an air damper effect of the almost closed space 918 defined by the supporting member 914 and the backlight frame member 916. As a result, according to our experiments, the liquid crystal panel 900 (having the same sizes as the one in FIG. 4B and used together with a 3.0 mm-thick plastic panel-fixing plate measuring vertically 376 mm and transversely 315 mm) showed a remarkably smaller deformation than the panel explained with reference to FIG. 4B as shown in FIG. 11.

As described before, the almost closed space 918 in this embodiment is essential in order to attain an air damper effect but it need not be completely airtight. Accordingly, a small bore conduit 919 for arranging a wiring cable for supplying electric signals to the circuit board 911 can be provided without problem, and a small bore or passage should rather be provided for the same reason as described above. The air damper effect is also exhibited also in response to a dropping impact in the −Z direction, as is in response to the impact in the +Z direction, to suppress the deformation of the liquid crystal panel 900. A similar effect is also attained in response to vibration, and the image quality deterioration thereby is prevented.

The pattern breakage prevention on the print-circuit film 910 as another characteristic will now be described. Referring to FIG. 10, the liquid crystal panel 900 is bonded to the whole periphery of the panel-fixing substrate 912 by the rubber-type adhesive 913, and the circuit board 911 is screwed (not shown) to the panel-fixing plate 912. As a result, when the liquid crystal panel 900 is displaced toward the backlight 907 but the circuit board 911 also follows the displacement as shown in the figure, so that only a sufficiently small stress is applied to the print-circuit film 910. According to our experiments, the difference in displacement between the connection between the liquid crystal panel 900 and the print-circuit film 910 and the connection between the circuit board 911 and the print-circuit film 910 was about 0.3 mm in response to a dropping impact of 100 G in the +Z direction. The reason why the value was not zero mm was that the panel-fixing plate 912 was slightly inclined. However, the pattern of the print-circuit film 110 used by us is not broken by this level of displacement difference and has left no problem in respect of reliability.

Also with respect to deformation in the −Z direction, the displacement of the liquid crystal panel is suppressed due to the air damper effect, and the displacement difference between the connections of the print-circuit film 910 with the liquid crystal panel 900 and with the circuit board 911 was about 0.3 mm in response to a dropping impact of 100 G.

Figure 2B:
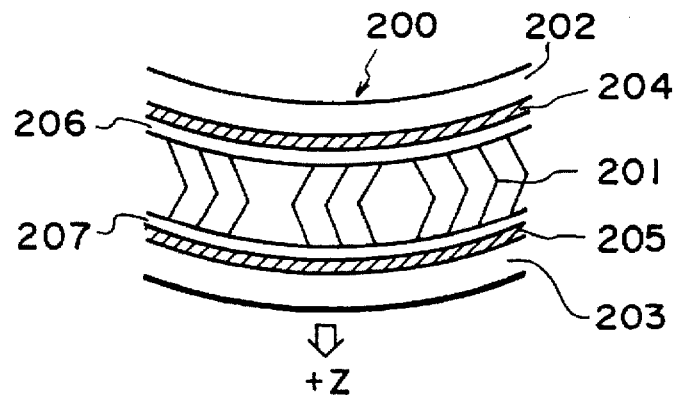

FIGS. 12A and 12B are presented for illustrating the state of deformation in response to a dropping impact in another direction, e.g., in a −X direction, wherein FIG. 12A shows an initial state and FIG. 12B shows a state under the impact. When an impact in this direction is applied, a flexural deformation leading to an alignment defect as explained with reference to FIGS. 2A and 2B does not readily occur, but there arises a large displacement (2.4 mm in response to an impact of 100 G according to our experiment) of the panel-fixing plate 112, because no air damper effect is expected, whereby the elastic member 915 is elongated as shown in FIG. 12B whereas the elastic member 915 at the opposite end causes a contraction (while not shown). However, when the print-circuit film 910 is noted, the distance between the circuit board 911 and the liquid crystal panel 900 does not change because both members are fixed to the panel fixing plate 912. Further, unlike from the dropping impact in the ±Z directions, no change in parallelism between the panel-fixing plate 912 and the liquid crystal panel 900 occurs, so that no external stress is applied to the print-circuit film 910. This holds true with the cases of external impacts in another direction, such as +Y or ±Y.

As described above, according to this embodiment, the liquid crystal panel 900, the print-circuit film 910 and the circuit board 911 are fixed in a floated state within a window or opening of the supporting member 914, there is accompanied less liability of alignment deterioration and pattern electrode breakage under application of a mechanical external load during production and user's handling on the market in comparison with the conventional apparatus. More importantly, a very high reliability is attained with respect to alignment deterioration and pattern electrode breakage, even when the liquid crystal display apparatus of the present invention is placed under a dropping impact and/or a vibration. In the above embodiment, a rubber-type silicone adhesive is used to constitute the elastic member 915, but another rubbery or elastomeric material can be used instead thereof.

FIG. 13 shows a further preferred embodiment of the present invention, wherein similar reference numerals denote similar members as in FIG. 9. In this embodiment, the upper polarizer 903 and the lower polarizer 905 are directly applied to the liquid crystal panel 900, whereby the cover 917, the upper polarizer glass plate 904 and the lower polarizer glass plate 906 are omitted to provide a thinner and a lighter apparatus. Further, a thinner panel-fixing plate 912-a of a metal, such as aluminum is used and an adhesive 913-a is applied in a width of 0.1–0.5 mm along the whole periphery of the side face of the liquid crystal panel 900. Herein, the adhesive is applied in such a small width in order to minimize the displacement difference between the liquid crystal panel 900 and the circuit board 911-a to prevent the breakage of the electrode pattern on the print-circuit film. The elastic member 915-a is constituted not by an adhesive but by an extrusion-shaped silicone rubber, and both ends thereof are joined by pressing to the panel-fixing plate 912-a and the supporting member 916-a integrally formed with the backlight frame member 916. Herein, the shaped rubber elastic member is used in order to avoid a difficulty in application of an adhesive to form an elastic member 915 as shown in FIG. 9 when the backlight frame member 916 is formed integrally with the supporting member 916-a for supporting the panel-supporting plate 912-a in a floating state. The integral formation of the backlight frame part 916 and the supporting 916-a is performed so as to minimize the number of parts for decreasing the production cost and improving the processibility. Further, the panel-fixing plate is formed by a metal so as to provide a sufficient rigidity in a similar thickness as the liquid crystal panel 900. It is also possible to integrally shape the elastic member 915-a with the panel-fixing plate 912-a for reduction in production cost. In this case, the panel-fixing plate may preferably be made of a metal in view of the heat resistance during the shaping.

According to this structure, the same effects as in the embodiment of FIG. 9 are attained due to the floating or hanging-supporting structure or flexible support structure by means of the elastic member 915-a, the air damper function of the almost closed space 918 and the fixing of the liquid crystal panel 900 and the circuit board 911-a to the panel-fixing plate 912-a. Incidentally, in the embodiment shown in FIG. 13, the face of the circuit board 911-a contacting the panel-fixing plate 912-a is electrically insulated (not specifically shown) to prevent the occurrence of short circuit between the pattern electrodes and between the loaded elements due to the panel-fixing plate of a metal. Further, a leadwire cable 920 is connected to the circuit board 911-a through a small bore 919, which is disposed at a lower face of the apparatus in this embodiment instead of the side face in the embodiment of FIG. 9. This means that a part allowing a communication between the almost closed space and the external atmosphere can be disposed at an arbitrary part.

The above embodiments have been explained with reference to a ferroelectric liquid crystal principally in respect of an improvement in impact resistance but the panel supporting structure of these embodiments can be also applied to a nematic liquid crystal. Further, these embodiments are not restricted to transmission-type liquid crystal display apparatus but can be formed as a reflection-type liquid crystal display apparatus wherein the backlight 907 in FIG. 12 or FIG. 13 is replaced by a supporting member lacking an illuminating function. Further, the above-mentioned effect attained by providing an almost closed space can be attained not only by disposing the almost closed space below the liquid crystal panel (on the backlight side) but also by disposing it above the liquid crystal panel, e.g., by forming an almost closed space as a space defined by the liquid crystal panel 900, the panel-fixing plate 912, the upper cover 917, the upper polarizer glass plate 904, the elastic member 915 and the adhesive 913. A similar effect is attained even when such an almost closed space is formed both above and below the liquid crystal panel.

In another preferred embodiment of the present invention, a heater is disposed so as not to contact any other members than the liquid crystal panel to minimize the temperature difference along the heater. Further, the heater and the liquid crystal panel are flexibly supported in a floating or hanging state by an elastic member to form an almost closed space within the liquid crystal display apparatus. According to this embodiment, when the temperature of the liquid crystal panel is controlled by using the heater, the temperature difference along the extension of the liquid crystal panel is minimized, whereby a uniform image can be attained and it is possible to prevent a decrease in reliability of the liquid crystal display apparatus caused by a re-aligning treatment.

Figure 15:
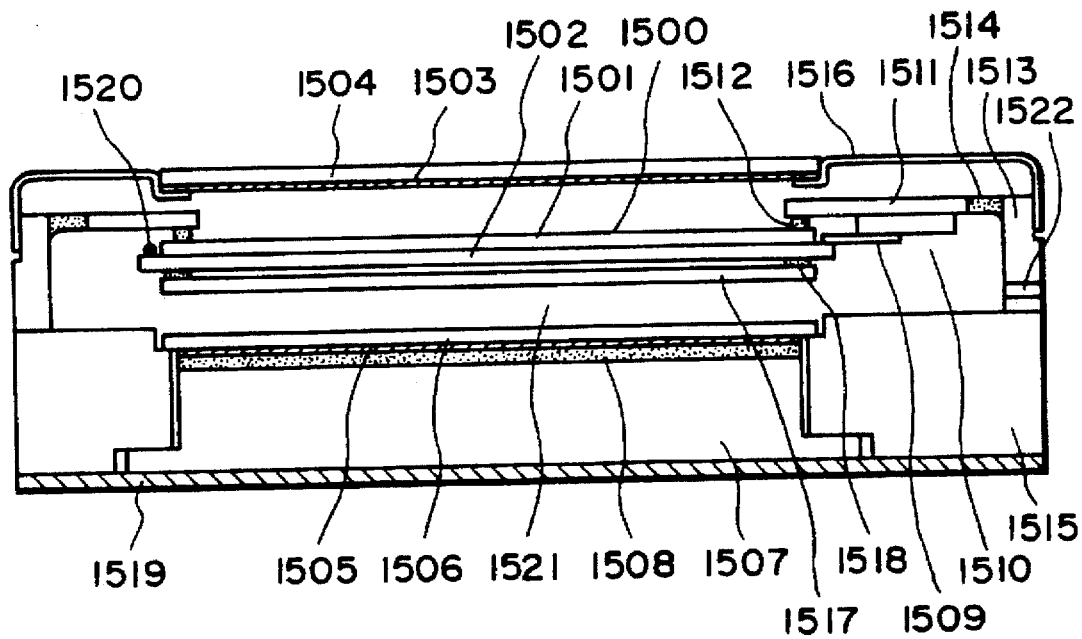
FIG. 15 is a cross-sectional view of another embodiment of the liquid crystal display apparatus of the invention.
Figure 16:
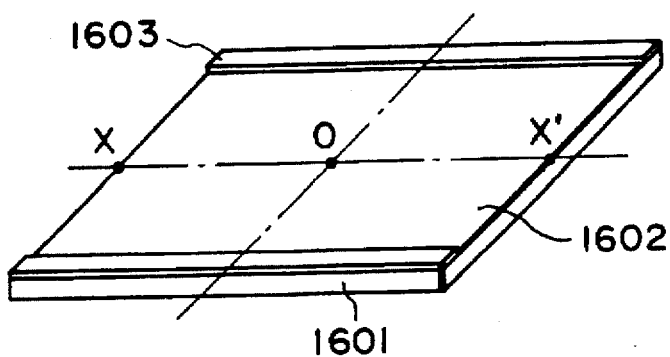
FIG. 16 is a perspective view of a heater shown in FIG. 15.

FIG. 15 is a sectional view of such an embodiment of the liquid crystal display apparatus according to the invention. Referring to FIG. 15, the apparatus includes a liquid crystal panel 1500 comprising a pair of oppositely disposed glass substrates 1501 and 1502 between which a ferroelectric liquid crystal (not specifically shown) is disposed in a thickness of about 1.4 micron. The ferroelectric liquid crystal used in this embodiment shows a phase transition series from a higher temperature of isotropic liquid phase→cholesteric phase→smectic A phase→chiral smectic C phase→crystal phase, in which the chiral smectic C phase shows ferroelectricity. The chiral smectic temperature range is about −15° C. to 55° C., and the cholesteric temperature range is about 75° C. to 85° C. The liquid crystal display apparatus further includes an upper polarizer 1503, an upper polarizer glass plate 1504 on which the upper polarizer is applied, a lower polarizer 1505, a lower polarizer glass plate 1506 on which the lower polarizer is applied, a backlight 1507 for illuminating the liquid crystal panel 1500, and a diffusion plate 1508 for converting illumination light from the backlight into scattered diffusive light; lamps, a reflecting plate, etc., disposed inside the backlight 1507 being omitted from showing. The display apparatus further includes a circuit board 1510 for driving the liquid crystal panel 1500, a print circuit film 1509 of, e.g., a TAB (tape automation bonding) film, for electrically connecting the circuit board 1510 to the electrode part of the liquid crystal panel 1500, a panel-fixing plate 1511 of, e.g., a plastic, for fixing the liquid crystal panel 1500 and the circuit board 1510, a rubber-type adhesive 1512 applied onto the whole peripheral part of the upper peripheral surface part (particularly in the vicinity of the liquid crystal sealing part) of the liquid crystal panel 1500 for bonding the panel 1500 to the panel fixing plate 1511, a supporting member 1513 having an opening for supporting the panel-supporting plate 1511 therein, an elastic member 1514 of e.g. a rubber-type silicone adhesive packed between the opening frame part of the supporting member 1513 and the peripheral edge of the panel-supporting plate 1511, and a housing 1515 for supporting the frame-shaped supporting member 1513. To the opening window frame of the housing 1515 are fixed the lower polarizer glass plate by means of, e.g., an adhesive and the backlight 1507 by means of, e.g., a screw (not shown). The diffusion plate 1508 above the backlight face-contacts the lower polarizer 1505 and the surface of the diffusion plate 1508 has been subjected to a non-glare treatment as by embossing for preventing occurrence of interference fringes due to the contact. Further, a plastic cover 1516 is fixed to the frame-like supporting member 1513 by means of e.g. a screw (not shown), and the upper polarizer glass plate 1504 is fixed to the cover 1516, e.g., by a double face-coated adhesive tape (not shown). Further, a heater 1517 for heating the liquid crystal panel 1500 is fixed to the liquid crystal panel 1500 with a rubber-type adhesive 1518 applied to the whole periphery of the upper surface of the heater 1517. The heater 1517 is constituted by forming a transparent electrode 1602 of e.g. an ITO ($In_2O_3$-$SnO_2$) film on the entirety of one surface of a glass substrate 1601 and lead-out electrodes 1603 on both sides thereof by application of an electroconductive paint as shown in FIG. 16. Referring again to FIG. 15, a board 1519 comprising a heater-control circuit is fixed to the housing e.g. by a screw (not shown) and controls the heat generation from the heater 1517 based on temperature signals from a temperature sensor 1520 attached to the liquid crystal panel 1500. As a result, an almost closed space 1521 is defined by the liquid crystal panel 1500, heater 1517, adhesives 1512 and 1518, panel-fixing substrate 1511, elastic member 1514, supporting member 1513, housing 1515 and lower polarizer glass plate 1506. A small bore 1522 is provided for communicating the almost closed space 1521 with the exterior atmosphere and passing therethrough wiring cables for supplying electric signals to the circuit board 1510, a power supply line to the heater 1517 and a leadwire (not shown) to the temperature sensor. The small bore 1522 can be arbitrarily designed with respect to its size, position, shape, number, etc., as far as it allows the function of the almost closed space. For example, even a rectangular-shaped bore can be used. In this embodiment, the supporting member 1513 and the housing 1515 are disposed as different members but can be integrally formed.

Then, some characteristic features of the above embodiment of the liquid crystal display apparatus will be described. In the above liquid crystal display apparatus, the liquid crystal panel 1500 may be heated by the heater 1517 for ensuring the high-speed responsive characteristic of the ferroelectric liquid crystal. In this instance, it is important to maintain the temperature of the liquid crystal panel 1500 at a prescribed temperature (denoted hereinafter by Tc) within a temperature range providing chiral smectic C phase and minimize the temperature fluctuation along the extension of the liquid crystal panel to obtain a uniform image. In this embodiment, the heater 1517 does not contact any members other than the liquid crystal panel 1500 and is present within the almost closed space 1521, so that the heat from the heater 1517 is efficiently conducted to the liquid crystal panel 1500 and heat dissipation from the periphery of the heater 1517 is alleviated than in a conventional apparatus.

Figure 17:
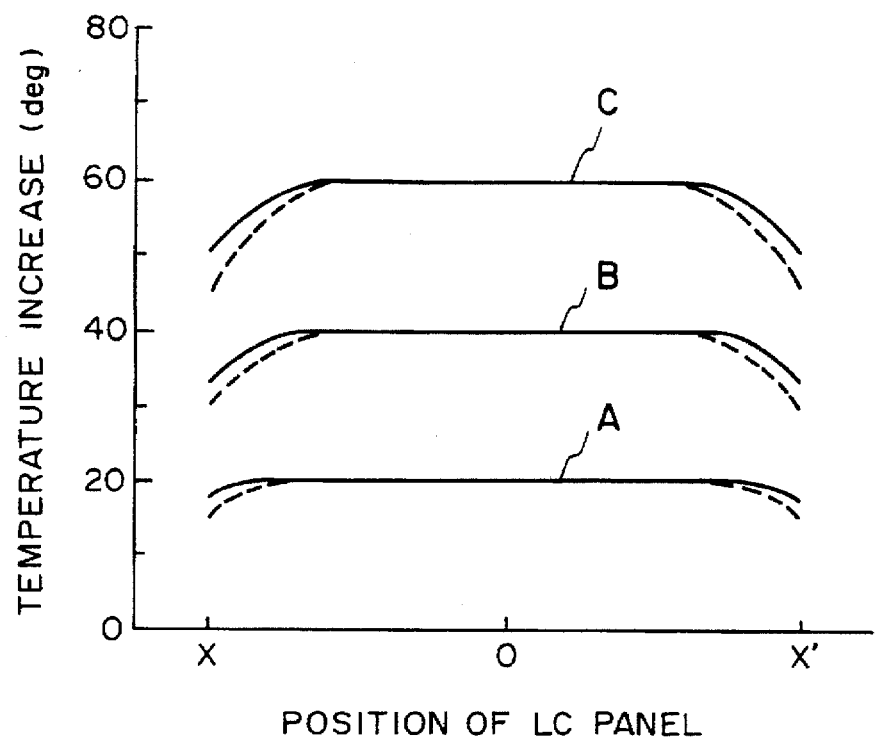
FIG. 17 is a graph showing temperature distributions along a panel.

FIG. 17 schematically illustrates the temperature distributions along the liquid crystal panel 1500 surfaces in a comparative apparatus (indicated by dashed lines) and this embodiment (indicated by solid lines) when the heating is performed solely by energizing the heater 1517. In an actual operation, a moderate distribution inherent to a difference in resistance caused during the production but it is omitted herein for convenience of explanation. In FIG. 17, the positions on a liquid crystal panel is indicated on the abscissa corresponding to the positions X, O and X' in FIG. 16, and the increased temperatures attained by the heating are indicated on the ordinate. The comparison is made between the comparative apparatus example and this embodiment under the condition of giving the same temperature increase at the position O at the central part of the liquid crystal panel. The curves A, B and C correspond to temperature increases of 20 degrees, 40 degrees an 60 degrees, respectively, at the central point O. As described above, however, the heater efficiently in this embodiment is better than in the comparative example, so that the heater power consumption is smaller in the embodiment than in the comparative example. In an actual operation, other heat sources such as the backlight, driver IC's and the liquid crystal panel itself are present except at the time of the re-aligning treatment, but the heat evolution from the heater is larger than those from the other members and the influences of the environmental temperature are also greater, so that the temperature distribution given by the heater alone is discussed in connection with the environmental temperature.

The curves A, B and C in FIG. 17 correspond to the following cases. When the controlled temperature Tc of the liquid crystal panel is 45° C., the curve A represents a temperature distribution along the liquid crystal panel in the case where the liquid crystal panel is maintained at 45° C. by heating under an environmental temperature of 25° C., and the curve B similarly represents a temperature distribution in the case where the liquid crystal panel is maintained at 45° C. under an environmental temperature of 5° C. Further, the curve C represents a temperature distribution in the case where the liquid crystal panel is heated up to 85° C. for re-aligning under an environmental temperature of 25° C. As shown in this figure, the temperature difference becomes larger as the heating quantity is larger, i.e., as the temperature increase is larger, so that the temperature decrease at the peripheral parts along the panel becomes smaller in this embodiment than in the comparative example. As a result, the temperature difference along the liquid crystal panel becomes smaller so that it becomes possible to display a uniform image over the entire face of the panel.

In case where the liquid crystal panel causes crystallization at a low temperature or alignment defects, such as sanded texture, under application of a mechanical stress, it becomes necessary to effect a re-aligning treatment of heating the ferroelectric liquid crystal to cholesteric phase or isotropic liquid phase, followed by gradual cooling. In the case of the ferroelectric liquid crystal used in this embodiment, it is preferred to heat the liquid crystal into isotropic liquid phase and accordingly it is preferred to the entirety of the liquid crystal panel to the isotropic phase lower limit temperature of 85° C. or higher. As has been explained with reference to the curve C in FIG. 16, the comparative example results in a large temperature difference, so that a considerably higher temperature is required at the central point O of the liquid crystal panel in order to ensure the temperature of 85° C. or higher even at the periphery of the liquid crystal panel. On the other hand, in this embodiment, the resultant temperature difference is smaller than in the comparative example, so that the maximum temperature along the liquid crystal panel is suppressed to require only a smaller power consumption. Further, the polarizer and the backlight member are disposed spaced apart from the heater so that these members reach only a lower temperature at the time of the re-aligning treatment than in the comparative example, so that the deterioration of these members is prevented. Further, as the polarizers are not directly attached to the liquid crystal panel, a reliable re-aligning treatment can be effected to provide a uniform alignment state without imparting a mechanical stress to the liquid crystal panel.

Another characteristic feature of this embodiment is that it has a structure provided with the almost closed space. Accordingly, the liquid crystal display apparatus of this embodiment does not cause alignment defects unless it is not subjected to an extraordinarily severe impact, so that frequent re-aligning treatment as in the conventional example is not required. Accordingly, it provides a liquid crystal display apparatus which is easy for handling and maintenance, is free from thermal deterioration of member, such as polarizers, and is provided with an improved reliability.

Figure 18:
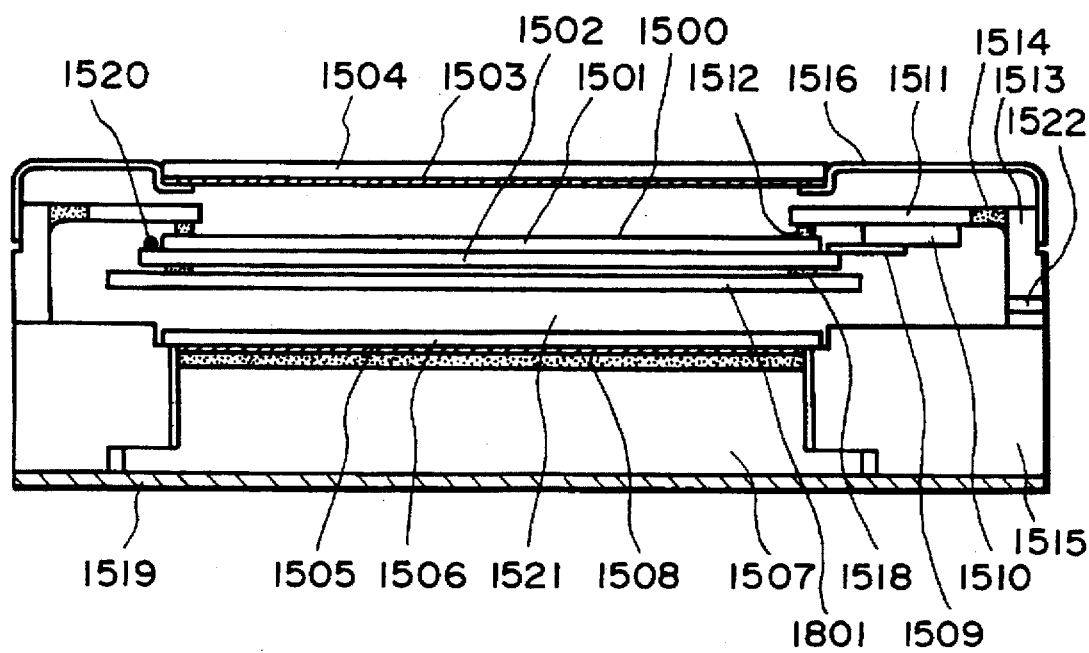
FIG. 18 is a cross-sectional view of another embodiment of the liquid crystal display apparatus of the invention.

FIG. 18 shows a further preferred embodiment of the present invention, wherein similar reference numerals denote similar members as in FIG. 15. In this embodiment, in order to further minimize the temperature difference along the liquid crystal panel 1500 than in FIG. 15, a heater 1801 which is larger in size than the liquid crystal panel 1500 is provided. More specifically, the heater 1801 is caused to have a heat-generating area which is larger than the display area of the liquid crystal panel, whereby the temperature decrease at the periphery of the liquid crystal panel 1500 is further minimized. In this embodiment, many advantages are attained similarly as in the embodiment of FIG. 15.

Figure 19:
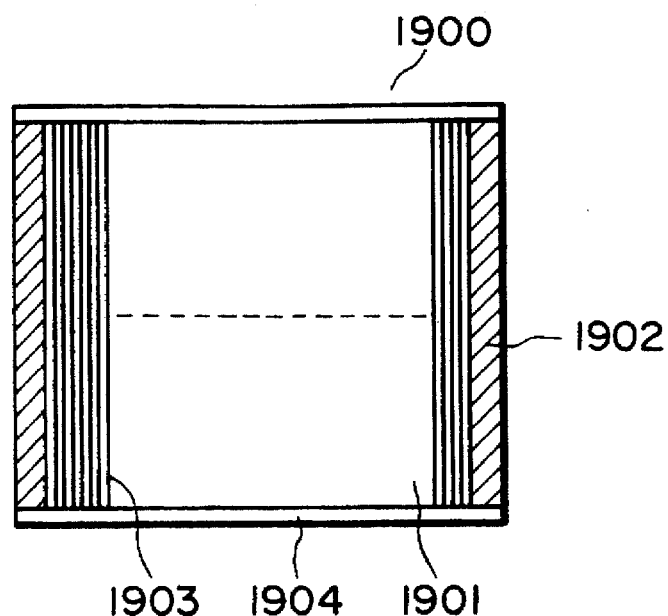
FIG. 19 is a perspective view of a heater shown in FIG. 18.
Figure 20:
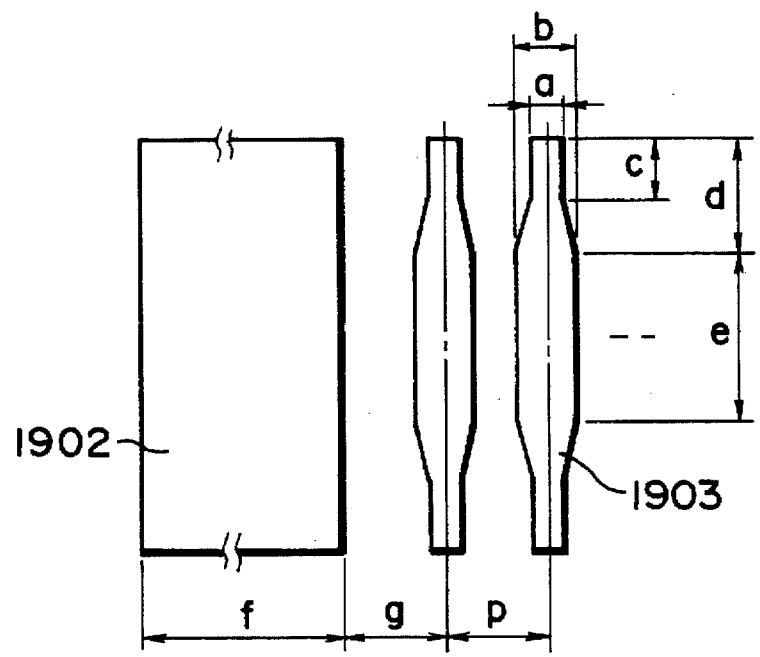
FIG. 20 is an enlarged view of a heater pattern shown in FIG. 19.

FIG. 19 is a plan view of a heater 1900 used in a further preferred embodiment of the present invention, which has the same structure as in the embodiment of FIG. 15 except for the use of the heater 1900 while it is not specifically shown. The heater 1900 comprises a plurality of heat-generating transparent electrodes in the form of parallel stripes disposed on a glass substrate 1901. The stripe transparent electrodes include a pair of wider electrodes 1902 (referred to as "adjusting electrode(s)") disposed on both lateral sides of the heater and a plurality of narrower electrodes 1903 (referred to as "main electrodes") inside of the adjusting electrodes 1902. The main electrodes 1903 are arranged at a equal pitch over the whole inside surface in this embodiment but only a part thereof is shown and the other is omitted from showing. Along both ends of the adjusting electrodes 1902 and main electrodes, low-resistivity lead-out electrodes 1904 for supplying voltages are disposed. FIG. 20 is a schematically enlarged view of a part of the electrodes for showing the shapes of the electrodes. Referring to FIG. 20, each main electrode has a shape which is longitudinally and laterally symmetrical, and has different widths at the ends and the center between which tapered portions are formed. More specifically, each main electrode has a width a at its end part, a length c of the end part, a broader width b at its central part, a length e of the central part, a distance d between the broad width part and one end. The main electrodes are arranged at a pitch p. Further, each adjusting electrode has a width d and is disposed with a distance q from the center of the closest main electrode. In a particular embodiment, a 1000 Å-thick ITO film with a specific resistivity $\rho=3\times10^{-4}$ ohm.cm was formed by sputtering on a 1.1 mm-thick glass plate measuring 300×300 mm and was patterned by photolithography into transparent stripe electrodes as shown in FIG. 20 with sizes of a=100 microns, b=140 microns, c=10 mm, d=50 mm, e=200 mm, p=q=250 microns and f=10 mm. Further, 3000 Å-thick Al electrodes 504 were formed for voltage application on both ends of the transparent heat-generating electrodes.

In this embodiment of the liquid crystal display apparatus having the above-constituted heater, each main electrode has a narrower electrode width at its end than its center so that the end generates a larger heat quantity because of an increased current density, and also an increased quantity of heat is evolved at lateral sides of the heater because of wider adjusting electrodes. As a result, a substantial decrease in temperature does not result at four peripheral sides of the heater, so that the temperature difference over the liquid crystal display panel can be further decreased than in the previous embodiment. In FIG. 20, main electrodes and an adjusting electrode are disposed independently from each other, but they can be formed in connection with each other (e.g., at a part just below the Al lead electrodes 1904). The lead electrodes 1904 need not be formed of Al but can be made of printed Al paste, ultrasonically disposed solder, copper foil tape or a combination of these. This embodiment can also exhibit the effects explained with respect to the previous embodiment.

The above embodiments have been explained with reference to a ferroelectric liquid crystal, but the liquid crystal panel and heater supporting structure of these embodiments can be also applied to a nematic liquid crystal to attain improvements in respects of impact resistance and image quality. Further, these embodiments are not restricted to transmission-type liquid crystal display apparatus but can be constituted as a reflection-type liquid crystal display apparatus wherein the backlight 1507 in FIG. 15 or 18 is replaced by a supporting member lacking an illumination function but having a reflection function. In FIG. 20, each main electrode has been explained as having a longitudinally and laterally symmetrical shape, but the parameters a - q and p defining pattern electrode shapes can be selected arbitrarily depending on the temperature distribution of an actual liquid crystal panel.

As described above, the following advantageous effects are attained according to the present invention.

(1) As a liquid crystal panel is flexibly fixed in a floating or hanging state to utilize an air damper effect, the alignment deterioration of the liquid crystal panel is prevented against mechanical external force, dropping impact and vibration caused during the transportation and operation of the liquid crystal display apparatus, thereby providing a liquid crystal display apparatus using a ferroelectric liquid crystal having a remarkably improved reliability.

(2) A large-size ferroelectric liquid crystal panel can be realized.

(3) The liquid crystal panel is fixed or supported in a floating state so that the deformation of the liquid crystal panel can be minimized against an external mechanical load exerted during the assemblage of the liquid crystal panel, so that the ferroelectric liquid crystal panel is reliably fixed.

(4) A plastic or non-metallic housing can be used, so that a remarkable reduction in production cost can be expected and a light-weight apparatus can be provided.

(5) When the image quality on the liquid crystal panel is deteriorated due to some abnormality during the operation of the liquid crystal display apparatus, the liquid crystal panel can be subjected to a re-aligning treatment as it is fixed in the housing, so that the maintenance of the apparatus is conveniently performed.

(6) As the liquid crystal panel and the circuit board in combination with the panel-fixing plate are fixed or supported in a floating state to utilize an air damper effect, the alignment deterioration of the liquid crystal panel is prevented against mechanical external force, dropping impact and vibration exerted during the transportation and operation of the liquid crystal display apparatus and also the breakage of a circuit wiring on the circuit board and the liquid crystal panel, whereby the reliability of a liquid crystal display apparatus using a ferroelectric liquid crystal can be remarkably increased.

(7) As the liquid crystal panel and the circuit board are supported in a floating state together with the panel-fixing plate, the deformation of the liquid crystal panel and the deformation of the circuit board-connecting part can be minimized against the external mechanical load exerted during the assemblage of the liquid crystal panel, so that the ferroelectric liquid crystal panel can be reliably fixed.

(8) The liquid crystal panel and the circuit board are fixed to the panel-fixing plate, and the panel-fixing plate is bonded immediately after connecting the circuit board to the liquid crystal panel, so that the deformation or breakage at the circuit board-connecting part can be minimized against a mechanical external load during subsequent assemblage steps and the processing efficiency is improved.

(9) It is possible to display a uniform image on the whole liquid crystal display area regardless of an environmental temperature change in a liquid crystal display apparatus controlled at a high temperature by using a heater.

(10) A high liquid crystal panel-heating efficiency is accomplished by the heater to economize the heater power consumption.

(11) The thermal deterioration of the number, such as a backlight and polarizers, can be prevented to remarkably improve the reliability of the liquid crystal display apparatus.

(12) Because of the air damper function of the almost closed space, the alignment deterioration of the liquid crystal panel can be prevented against mechanical external force, dropping impart and vibration caused during the temperature and operation of the liquid crystal display apparatus, so that frequency re-aligning treatment is not required and the liquid crystal display apparatus can be conveniently used with an improved maintenance efficiency.

What is claimed is:

1. A method for producing a liquid crystal apparatus, comprising the steps of:
   a) providing a liquid crystal panel, a circuit board for driving the liquid crystal panel, and a panel fixing member having an opening;
   b) electrically connecting the circuit board to the liquid crystal panel via a circuit film;
   c) fixing the liquid crystal panel onto the panel fixing member so as to substantially expose the liquid crystal panel through the opening of the panel fixing member;
   d) fixing the circuit board onto the panel fixing member;
   e) disposing an elastic member along a periphery of the panel fixing member;
   f) affixing the elastic member to a supporting member; and
   g) disposing a plate-like member behind the liquid crystal panel in a direction of viewing the liquid crystal panel so as to define an almost closed space with the liquid crystal panel, the panel fixing member, the elastic member the supporting member and the plate-like member, whereby an air damping effect is created to suppress flexural deformation of the liquid crystal panel,
   said step (f) being performed immediately after said step (b).

2. A method according to claim 1, wherein the liquid crystal panel contains a nematic liquid crystal.

3. A method according to claim 1, wherein the liquid crystal panel contains a ferroelectric liquid crystal.

4. A method according to claim 1, wherein the liquid crystal panel is supported so as to suppress a flexural displacement thereof to within 2.5 mm at most at a time of an impact of up to 130 G.

5. A method according to claim 1, wherein said almost closed space communicates with ambient atmosphere through a bore.

6. A liquid crystal display apparatus, comprising:

a liquid crystal panel comprising a pair of substrates and a liquid crystal disposed between the substrates;

a supporting member for supporting the liquid crystal panel via an elastic member;

a light source disposed behind the liquid crystal panel with reference to a direction of viewing; and a plate-like member disposed between the liquid crystal panel and the light source so as to define a space behind the liquid crystal panel and in front of the light source, respectively in the direction of viewing the liquid crystal panel, the space being defined as an almost closed space, whereby an air damping effect is created to suppress flexural deformation of the liquid crystal panel.

7. An apparatus according to claim 6, wherein said plate-like member comprises at least one of a polarizer, a light curtain and a diffusion plate.

8. An apparatus according to claim 6, wherein said liquid crystal is a chiral smectic liquid crystal.

9. A liquid crystal display apparatus, comprising:

a liquid crystal panel comprising a pair of substrates and a liquid crystal disposed between the substrates;

a frame member for fixing the liquid crystal panel;

a drive circuit board disposed on the frame member;

a print circuit film for electrically connecting the drive circuit board and the liquid crystal panel;

a supporting member for supporting the frame member via an elastic member;

a light source disposed behind the liquid crystal panel in a direction of viewing the liquid crystal panel; and a plate-like member disposed between the liquid crystal panel and the light source so as to define a space behind the liquid crystal panel and in front of the light source, respectively in the direction of viewing the liquid crystal panel, the space being defined as an almost closed space, whereby an air damping effect is created to suppress flexural deformation of the liquid crystal panel.

10. An apparatus according to claim 9, wherein said liquid crystal is a chiral smectic liquid crystal.

11. A method for producing a liquid crystal apparatus, comprising the steps of:

a) providing a liquid crystal panel, a circuit board for driving the liquid crystal panel, and a panel fixing member;

b) electrically connecting the circuit board to the liquid crystal panel via a circuit film;

c) fixing the liquid crystal panel onto the panel fixing member via an elastic member along a periphery of the panel;

d) fixing the circuit board onto the panel fixing member;

e) disposing a plate-like member between the liquid crystal panel and a light source so as to define an almost closed space with the liquid crystal panel, the elastic member and the plate-like member, whereby an air damping effect is created to suppress flexural deformation of the liquid crystal panel.

12. A liquid crystal display apparatus comprising:

a liquid crystal panel comprising a pair of substrates and a liquid crystal disposed between the substrates;

a panel-fixing plate for fixing the liquid crystal panel;

a drive circuit board disposed on the panel-fixing plate;

a drive circuit board disposed on the panel-fixing plate;

a print circuit film for electrically connecting the drive circuit board and the liquid crystal panel;

a supporting member for supporting the panel-fixing plate via an elastic member;

a light source disposed behind the liquid crystal panel;

a plate-like member disposed between the liquid crystal panel and the light source so as to define a space behind the liquid crystal panel and in front of the light source, respectively in a direction for viewing the liquid crystal panel; and polarizers disposed on both sides of the liquid crystal panel, wherein the space is defined as an almost closed space so as to exhibit an air damping effect for suppressing flexural deformation of the liquid crystal panel.

13. An apparatus according to claim 12, wherein said liquid crystal is a chiral smectic liquid crystal.

14. An apparatus according to claim 12, wherein said liquid crystal is a ferroelectric liquid crystal.

15. An apparatus according to claim 12, wherein said plate-like member comprises a diffusion plate.

16. An apparatus according to claim 15, wherein said plate-like member further includes a light curtain.

17. An apparatus according to claim 12, wherein said plate-like member further includes a light curtain.

18. An apparatus according to claim 12, wherein said panel-fixing plate and the liquid crystal panel are bonded to each other with an adhesive.

19. An apparatus according to claim 12, wherein said supporting member has a bore for passing a leadwire cable therethrough.

* * * * *

UNITED STATES PATENT AND TRADEMARK OFFICE
CERTIFICATE OF CORRECTION

PATENT NO. : 5,710,607

DATED : January 20, 1998

INVENTOR(S): HIROFUMI IWAMOTO ET AL.

Page 1 of 2

It is certified that error appears in the above-identified patent and that said Letters Patent is hereby corrected as shown below:

On the title page:

[56] REFERENCES CITED

```
   Foreign Patent Documents
   "2093425  4/1990 Japan" should read
       --2-93425  4/1990 Japan--.
   "2178625  7/1990 Japan" should read
       --2-178625 7/1990 Japan--.
   "2264222 10/1990 Japan" should read
       --2-264222 10/1990 Japan--.
   "2264223 10/1990 Japan" should read
       --2-264223 10/1990 Japan--.

Insert:  --OTHER PUBLICATIONS
            Pat. Abs. Jp., Vol. 7, no. 212 (P-224) (1357)
            (JP-A-56-205765)  9/20/83--.
```

COLUMN 1

Line 60, "802," should read --804--. (first occurrence)

COLUMN 4

Line 51, "sectional" should read --cross-sectional--.

COLUMN 6

Line 41, "to fail" should read --causing a failing--.
Line 43, "collapsion" should read --collapse--.
Line 47, "sion" should read --se--.
Line 52, "references" should read --reference--.

UNITED STATES PATENT AND TRADEMARK OFFICE
CERTIFICATE OF CORRECTION

PATENT NO. : 5,710,607

DATED : January 20, 1998

INVENTOR(S) : HIROFUMI IWAMOTO ET AL.

It is certified that error appears in the above-identified patent and that said Letters Patent is hereby corrected as shown below:

<u>COLUMN 7</u>

Line 2, "cause" should read --causes--.

<u>COLUMN 16</u>

Line 8, "not" (second occurrence) should be deleted.
   Line 20, "than in" should read --compared to--.
   Line 40, "a" should read --an--.

Signed and Sealed this

Twenty-eighth Day of July, 1998

Attest:

BRUCE LEHMAN

*Attesting Officer*    *Commissioner of Patents and Trademarks*